US011995350B2

(12) United States Patent
BenHanokh et al.

(10) Patent No.: US 11,995,350 B2
(45) Date of Patent: May 28, 2024

(54) PREFETCHING CONTAINER DATA IN A DATA STORAGE SYSTEM

(71) Applicant: RED HAT, INC., Raleigh, NC (US)

(72) Inventors: Gabriel Zvi BenHanokh, Tel-Aviv (IL); Orit Wasserman, Mitzpe Aviv (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/132,356

(22) Filed: Dec. 23, 2020

(65) Prior Publication Data
US 2022/0197555 A1 Jun. 23, 2022

(51) Int. Cl.
*G06F 12/00* (2006.01)
*G06F 3/06* (2006.01)

(52) U.S. Cl.
CPC .......... *G06F 3/0659* (2013.01); *G06F 3/0613* (2013.01); *G06F 3/0653* (2013.01); *G06F 3/067* (2013.01); *G06F 3/0683* (2013.01)

(58) Field of Classification Search
CPC ....... G06F 3/0613; G06F 3/0653; G06F 3/067
USPC ......................................................... 711/154
See application file for complete search history.

(56) References Cited

U.S. PATENT DOCUMENTS

| 9,971,627 | B2 * | 5/2018 | Calciu ..................... G06F 9/528 |
| 9,996,380 | B2 | 6/2018 | Singh et al. |
| 10,176,106 | B2 | 1/2019 | Aronovich et al. |
| 10,218,633 | B2 | 2/2019 | Carl |
| 10,389,697 | B1 | 8/2019 | Kulkarni et al. |
| 10,482,108 | B2 | 11/2019 | Parees et al. |
| 10,659,533 | B1 * | 5/2020 | Zhao ................... G06F 12/0862 |
| 10,754,837 | B2 * | 8/2020 | Mishra .................. G06F 16/219 |
| 10,795,708 | B1 * | 10/2020 | Grechishkin ......... G06F 3/0667 |
| 10,839,050 | B2 * | 11/2020 | Ramanujam .......... G06F 21/105 |
| 11,093,297 | B2 * | 8/2021 | Watt, Jr. ................ G06F 9/5083 |
| 11,422,726 | B1 * | 8/2022 | Jo ........................... G06F 3/067 |
| 2004/0054831 | A1 * | 3/2004 | Johansson ............... G06F 21/86 710/200 |
| 2006/0075007 | A1 * | 4/2006 | Anderson ............. G06F 3/0608 |
| 2010/0218191 | A1 * | 8/2010 | Kannan ................. G06F 9/5027 718/103 |
| 2011/0153687 | A1 * | 6/2011 | Bacher .................... G06F 16/22 707/812 |
| 2014/0215459 | A1 * | 7/2014 | Tsirkin ................ G06F 9/45558 718/1 |

(Continued)

OTHER PUBLICATIONS

Stenbom, O., "Refunction: Eliminating Serverless Cold Starts Through Container Reuse," Department of Computing, Imperial College London, 2019, https://www.imperial.ac.uk/media/imperial-college/faculty-of-engineering/computing/public/1819-ug-projects/StenbomO-Refunction-Eliminating-Serverless-Cold-Starts-Through-Container-Reuse.pdf.

*Primary Examiner* — Mohamed M Gebril
(74) *Attorney, Agent, or Firm* — Kilpatrick Townsend & Stockton LLP

(57) ABSTRACT

Container data can be prefetched in data storage systems. For example, a computing device can determine a first container to be activated subsequent to an execution of a second container that is in an execution phase. The computing device can access a description specifying a data object for activating the first container. The computing device can receive the data object for the first container from a storage device using the description. The computing device can store the data object in a memory device prior to an end of the execution of the second container for subsequent use in an activation of the first container.

20 Claims, 3 Drawing Sheets

(56) References Cited

U.S. PATENT DOCUMENTS

| | | | |
|---|---|---|---|
| 2017/0034272 A1* | 2/2017 | Kazi | G06F 21/6218 |
| 2017/0206090 A1* | 7/2017 | Kirkpatrick | H04L 67/148 |
| 2018/0088974 A1* | 3/2018 | Chen | G06F 3/0659 |
| 2018/0137139 A1* | 5/2018 | Bangalore | G06F 16/2379 |
| 2018/0137174 A1* | 5/2018 | Cahana | G06F 9/455 |
| 2018/0157516 A1* | 6/2018 | Kristiansson | G06F 9/5027 |
| 2019/0079788 A1* | 3/2019 | Ruty | G06F 3/0665 |
| 2019/0171472 A1* | 6/2019 | Wyble | H04L 67/56 |
| 2019/0199784 A1* | 6/2019 | Ashner | G06F 16/9574 |
| 2020/0401606 A1* | 12/2020 | O'Shaughnessy | G06F 16/273 |
| 2021/0281529 A1* | 9/2021 | Baron | H04L 51/42 |
| 2022/0147378 A1* | 5/2022 | Tarasov | G06F 9/545 |
| 2022/0179570 A1* | 6/2022 | Thakkar | G06F 3/0685 |
| 2022/0197555 A1* | 6/2022 | BenHanokh | G06F 3/0659 |

\* cited by examiner

PREFETCHING CONTAINER DATA IN A DATA STORAGE SYSTEM

TECHNICAL FIELD

The present disclosure relates generally to data storage in cloud networks. More specifically, but not by way of limitation, this disclosure relates to prefetching container data in a data storage system.

BACKGROUND

Containers are standard units of software applications that includes the code as well as its dependencies and libraries. As a result, containers can be moved between environments without impacting functionality. For example, a container can be moved between a development environment, a test environment, and a production environment while maintaining full functionality. When a container is activated on a device, data involved in executing the container is moved from a storage device, which may be remote from the device, to a memory associated with the device.

DETAILED DESCRIPTION

Figure 1:
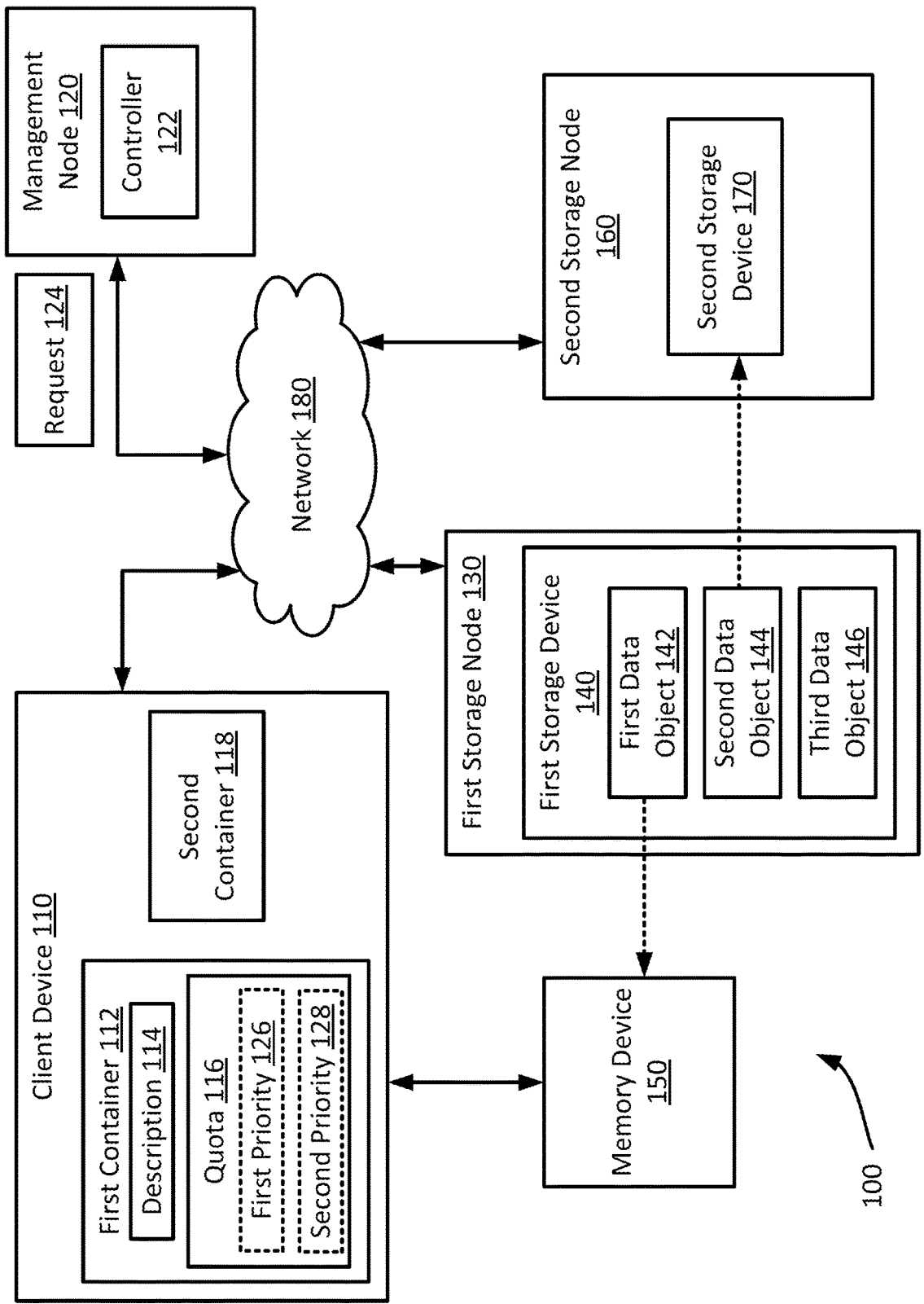
FIG. 1 is a block diagram of an example of a system for implementing container data prefetching according to some aspects of the present disclosure.

Activating a container on a user device involves loading data files from a storage device into a memory of the user device. In a cloud network, the storage device can be located far from the user device, resulting in a longer wait time for the data to be loaded. The operations of the container are slowed until the data is available in the memory, which can result in suboptimal storage performance for a cloud network with many containers and storage nodes.

Some examples of the present disclosure can overcome one or more of the abovementioned problems by providing a system for prefetching container data prior to an activation of the container. Prefetching data can include moving data for the container from a storage device into a memory device before the container is activated. Therefore, the data can be available in the memory device when the container activated, resulting in a faster start and improved performance for the system. The data may be stored in hybrid storage serving containers, hybrid storage serving containers, baremetal servers, virtual machine (VMs), etc. To prefetch data, the system can determine a container that is to be activated subsequent to an execution of another container that is in an execution phase. The system can access a description specifying a data object for activating the container. The system can then receive the data object for the container from a storage device using the description and store the data object in a memory device prior to an end of the execution of the other container. The data object can then be used in an activation of the container. Therefore, the container can have a reduced loading time, which may increase the storage performance of the system.

The system can also promote other data objects from lower storage tiers, such as slower storage devices or remote servers, to higher storage tiers, such as faster storage devices or near servers. For example, the system can determine a second data object is likely to be used during the execution of the container and move the data object within the system based on a quota. The quota can specify a priority of the second data object. The system can determine which storage device in the system corresponds to the priority and store the second data object in that storage device. As a result, the system can maximize use of the storage devices within constraints of the quota, which can additionally increase the storage performance of the system.

One particular example can involve a controller within the system determining container B is to be activated subsequent to an execution of container A that is in an execution phase. The controller can use a description of container B to determine that data object A is used in activating container B. The description can also indicate data object A is stored on hard disk drive A of a remote storage node. The controller can receive data object A from hard disk drive A and store data object A in a cache memory of a device that is to execute container A. Data object A can be stored in the cache memory prior to an end of the execution of container A, such that data object A is available in the cache memory when container B is activated.

The controller can also determine data object B, which is stored in hard disk drive A of the remote storage node, is likely to be used during an execution of container B. The controller can receive a quota for container B that indicates a high priority for data object B. In response, the controller can receive data object B from hard disk drive A and store data object B in solid-state drive A of a closer storage node, which corresponds to the priority of data object B. This may aid in a reduced execution time for container B and increased storage performance of the system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 implementing container data prefetching according to some aspects of the present disclosure. The system 100 can include a client device 110, a management node 120, a first storage node 130, and a second storage node 160. Examples of the client device 110 can include a desktop computer, a laptop, a mobile phone, etc. The client device 110, the management node 120, the first storage node 130, and the second storage node 160 can communicate with the over a network 180, such as a local area network (LAN) or the Internet.

In some examples, the client device 110 can execute containers, such as a first container 112 and a second container 118. Execution of a container can include activating the container and the container performing operations, such as read and write operations. A controller 122 of the management node 120 can schedule executions of the first container 112 and the second container 118. For example, the controller 122 can schedule the first container 112 to be activated and executed subsequent to an execution of the second container 118.

In some examples, the controller 122 can prefetch data used in an activation of the first container 112 prior to an end of the execution of the second container 118. To do so, the controller 122 can access a description 114 that specifies a first data object 142 for activating the first container 112. The description 114 can be generated by a container developer during creation of the first container 112. The controller 122 can transmit a request 124 for the description 114 to the first container 112. The first container 112 can be configured to provide the description 114 in response to receiving the request 124. The description 114 may additionally include an indication of a location of the first data object 142. For example, the description 114 can indicate the first data object 142 is stored in a first storage device 140. Examples of the first storage device 140 can include a hard disk drive (HDD), a tape storage device, flash storage devices, etc. The first storage device 140 can be part of the first storage node 130 of the system 100.

In some examples, the controller 122 can receive the first data object 142 from the first storage device 140 using the description 114. For example, the controller 122 can determine the first data object 142 is in the first storage device 140 based on the description 114. In response, the controller 122 can receive the first data object 142 from the first storage device 140. The controller 122 can then store the first data object 142 in a memory device 150 associated with the client device 110. For example, the memory device 150 can be a cache memory. The first data object 142 can be stored in the memory device 150 prior to an end of the execution of the second container 118. As a result, the first data object 142 can be available for an activation of the first container 112, and the first container 112 can have a warm start instead of a cold start at the time of activation. Although this example describes a data object from the first storage device 140 being stored in the memory device 150, other examples can involve a data object from any storage device or persistent memory device of the system 100 being stored in the memory device 150 in anticipation of container activation.

In some examples, the controller 122 can receive a quota 116 specifying priorities of other data objects associated with the first container 112. For example, the other data objects can be data objects that are frequently accessed during an execution of the first container 112, and the quota 116 can be a budget associated with each of the other data objects. The controller 122 can store the other data objects in storage devices of the system 100 based on the quota 116. As one particular example, the quota 116 can specify a first priority 126 of a second data object 144 associated with the first container 112. The first priority 126 may be based on a likelihood of the second data object 144 being used during the execution of the first container 112. For example, the controller 122 can determine a frequency of the first container 112 using the second data object 144 during execution and determine the first priority 126 accordingly. Data objects that are used more frequently may be determined to have a higher priority. The controller 122 can determine a second storage device 170 satisfies the quota 116 based on the first priority 126, such that the system 100 maximizes its use of resources without exceeding the quota 116. In response, the controller 122 can receive the second data object 144 from the first storage device 140 and store the second data object 144 in a second storage device 170 prior to the end of the execution phase of the second container 118.

In some examples, the first storage device 140 and the second storage device 170 can be part of a tiered storage system. The tiers may be based on distance from the client device 110, speed of the storage device, or cost of using the storage device. For example, storage devices closer to the client device 110, faster storage devices, and higher-cost storage devices may be considered to be at a higher tier. Higher tiers may be associated with higher-priority data objects. For example, the second storage device 170 can be a higher tier of storage, such as a faster storage device associated with a higher cost, than the first storage device 140. As one particular example, if the first storage device 140 is an HDD, the second storage device 170 can be a solid-state drive (SSD).

The controller 122 can promote data objects from lower storage tiers, such as spinning drives, remote servers, or busy servers, to higher storage tiers, such as solid-state drives, random access memory, persistent memory, near servers, non-busy servers, etc. Data objects can be moved from any slower storage device to a faster storage device in anticipation of container activation, such that the data objects can be received faster when the first container 112 is activated. Data objects from a storage device may additionally or alternatively be stored in a persistent memory device in anticipation of container activation based on the quota 116.

In some examples, the second storage device 170 may be located on the second storage node 160, which may be closer to the client device 110 in the system 100. As a result, if the first container 112 requests the second data object 144, it can be received faster than if the second data object 144 were in the first storage device 140. Data objects may be moved from any remote storage device to a storage device that is closer to the client device 110 based on the quota 116 and in anticipation of container activation.

In some examples, the quota 116 may additionally specify a second priority 128 for a third data object 146 associated with the first container 112. For example, the second priority 128 may be less than the first priority 126, therefore the priority for the third data object 146 can be less than the priority for the second data object 144. The controller 122 can determine the second priority 128 and the quota 116 can be satisfied by maintaining the third data object 146 in the first storage device 140. As a result, the controller 122 can maintain the third data object 146 in the first storage device 140.

It will be appreciated that promoting data objects based on speed, distance, or cost are non-limiting examples of promotion strategies. Other examples may include additional or alternative promotion strategies for moving data in the system 100.

In some examples, the controller 122 can also determine when the first container 112 is shut down or deactivated. In response to determining the first container 112 is deactivated, the controller 122 can receive the first data object 142 from the memory device 150 and store the first data object 142 in a lower storage tier, such as the first storage device 140. Therefore, data that was used by the first container 112 can be removed from the memory device 150 prior to the data becoming cold, which can free up space for data objects for containers that are to be activated subsequent to the execution of the first container 112. Additionally, the second data object 144 can be downgraded to the first storage device 140 in response to determining the first container 112 is deactivated.

In some examples, a data object may be frequently used by more than one container. For example, the second data object 144 may be used by the first container 112 and a third container that is to be activated subsequent to the execution of the first container 112. The controller 122 can determine when the first container 112 is deactivated and maintain the second data object 144 in the second storage device 170 to be used by the third container. A quota for the third container can specify the priority of the second data object 144 for the third container is different than the first priority 126 for the second data object 144 for the first container 112. The controller 122 can move the second data object 144 to a higher or lower tier of storage based on the quota for the third container. For example, the quota of the third container can indicate a lower priority for the second data object 144 than the first priority 126. As a result, the controller 122 can receive the second data object 144 from the second storage device 170 subsequent to the first container 112 being deactivated and store the second data object 144 in the first storage device 140 based on the quota of the third container. Moving data in response to determining a container is deactivated can allow other data objects to be higher tiers, resulting in an increase in storage performance for the system 100.

It will be appreciated that FIG. 1 is intended to be illustrative and non-limiting. Other examples may include more components, fewer components, different components, or a different arrangement of the components shown in FIG. 1. For instance, although the system 100 includes two containers and two storage nodes in the example of FIG. 1, the system 100 may include a larger number of containers or storage nodes in other examples. Additionally, the second storage device 170 may be a part of the first storage node 130, the second storage node 160, or may be local to the client device 110.

Figure 2:
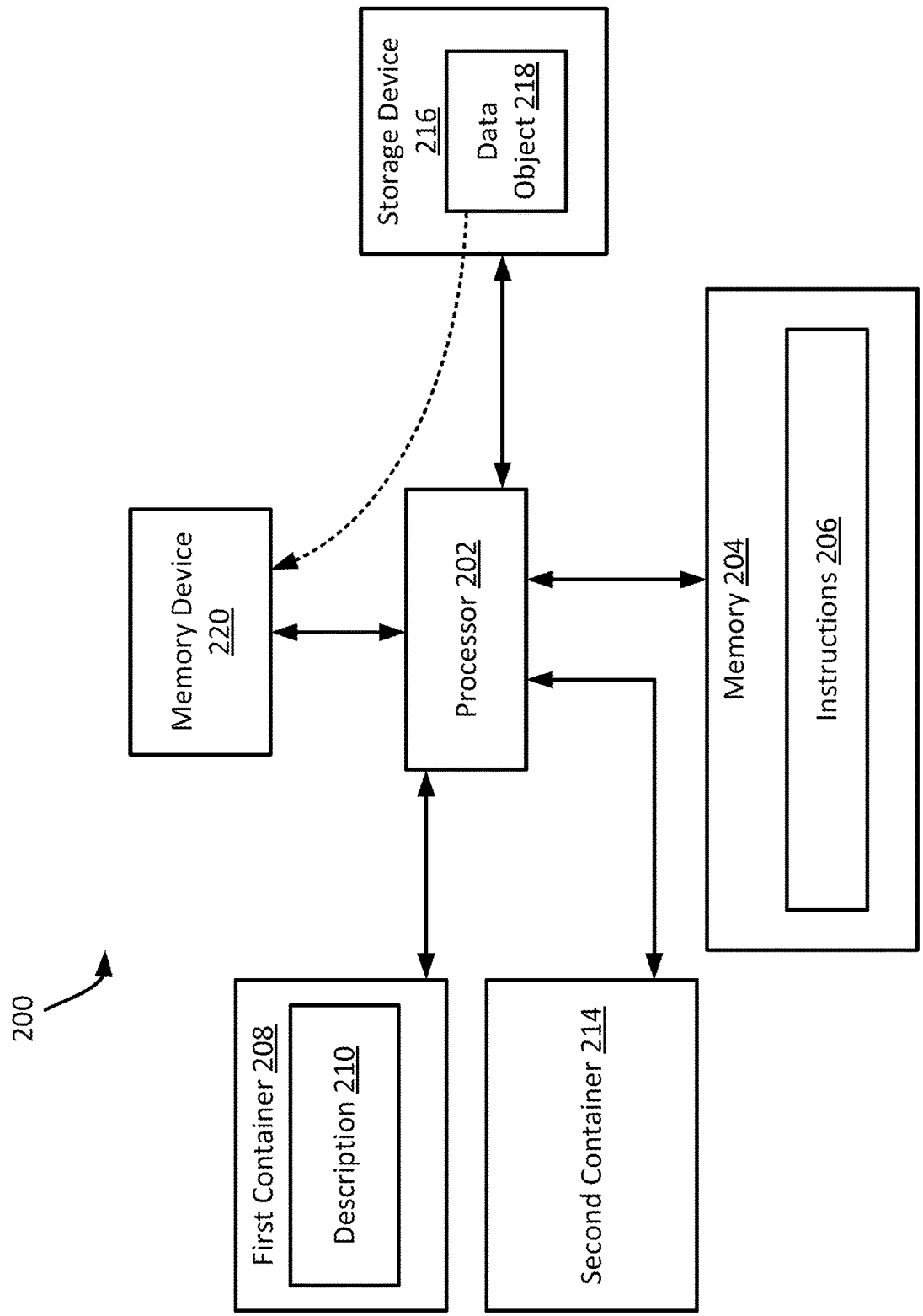
FIG. 2 is a block diagram of another example of a system for implementing container data prefetching according to some aspects of the present disclosure.

FIG. 2 is a block diagram of another example of a system 200 for implementing container data prefetching according to some aspects of the present disclosure. The system 200 includes a processor 202. The processor 202 may be part of a management node, such as the management node 120 in FIG. 1.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can determine a first container 208 to be activated subsequent to an execution of a second container 214 that is in an execution phase. The processor 202 can access a description 210 specifying a data object 218 for activating the first container 208. The processor 202 can receive the data object 218 for the first container 208 from a storage device 216 using the description 210. The processor 202 can store the data object 218 in a memory device 220 prior to an end of the execution of the second container 214 for subsequent use in an activation of the first container 208.

In some examples, the processor 202 can additionally execute the instructions 206 to receive a quota for the first container 208 specifying a priority for a second data object associated with the first container 208. The storage device 216 and the memory device 220 can be part of a tiered storage system with one or more additional storage devices. The processor 202 can receive the second data object from the storage device 216 and store the second data object in another storage device based on the quota. The other storage device can be in a higher storage tier and faster than the storage device.

Figure 3:
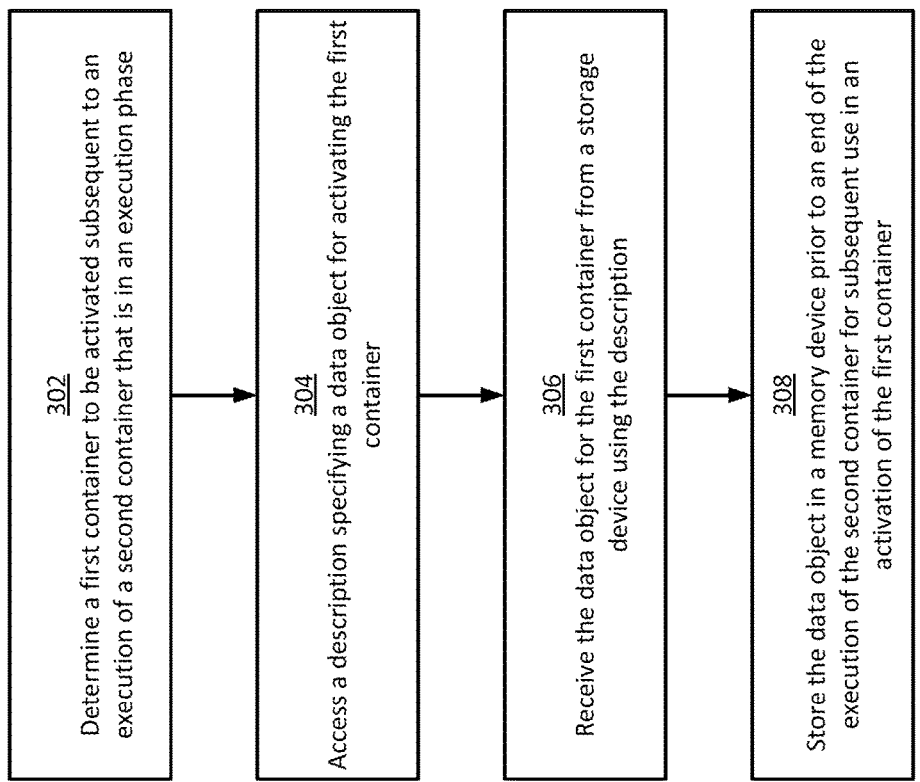
FIG. 3 is a flow chart of a process for prefetching container data according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can determine a first container 208 to be activated subsequent to an execution of a second container 214 that is in an execution phase. The processor 202 can schedule the first container 208 to be activated subsequent to the execution of the second container 214.

In block 304, the processor 202 can access a description 210 specifying a data object 218 for activating the first container 208. The description 210 can be generated by a developer of the first container 208. The processor 202 can transmit a request to the first container 208 for the description 210 and receive the description 210 in response to the request.

In block 306, the processor 202 can receive the data object 218 for the first container 208 from a storage device 216 using the description 210. The description 210 can indicate the data object 218 is located in the storage device 216, and the processor 202 can locate the data object 218 using the description 210.

In block 308, the processor 202 can store the data object 218 in a memory device 220 prior to an end of the execution of the second container 214 for subsequent use in an activation of the first container 208. With the data object 218 in the memory device 220, the first container 208 can have a warm start instead of a cold start when the first container 208 is activated. This can increase performance of the first container 208 and reduce a waiting period for the first container 208.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
    a processor; and
    a first memory device including instructions that are executable by the processor for causing the processor to:
        schedule, by a management node of a cloud network, a first container and a second container for execution by a client device, the first container being scheduled to be activated subsequent to an execution phase of the second container;

determine, by the management node that the second container is in the execution phase;

receive, by the management node and from the first container, a description specifying a data object for activating the first container;

receive, by the management node, the data object for the first container from a storage device of a first storage node of the cloud network using the description;

store, by the management node, the data object in a second memory device of a second storage node of the cloud network and based on a quota specifying a first priority of the first container for the data object prior to an end of the execution phase of the second container for subsequent use in an activation of the first container by the management node, the second storage node being located closer in proximity to the client device than the first storage node, the first priority of the first container for the data object being different than a second priority of the second container for the data object; and store the data object in the storage device in response to determining that the first container is deactivated, the storage device being a lower storage tier than the second memory device.

2. The system of claim 1, wherein the storage device is a first storage device and the data object is a first data object, and the first memory device further includes instructions that are executable by the processor for causing the processor to:

receive the quota for the first container specifying a third priority for a second data object associated with the first container;

receive the second data object from the first storage device; and store the second data object in a second storage device based on the quota prior to the end of the execution phase of the second container.

3. The system of claim 2, wherein the first storage device is slower than the second storage device.

4. The system of claim 2, wherein the quota specifies an additional priority for a third data object associated with the first container and the first memory device further includes instructions that are executable by the processor for causing the processor to maintain the third data object in the first storage device based on the quota.

5. The system of claim 1, wherein the first memory device further includes instructions that are executable by the processor for causing the processor to store the data object in the storage device in response to determining that the first container is deactivated by:

determining the first container is deactivated;

receiving the data object from the second memory device; and storing the data object in the storage device.

6. The system of claim 1, wherein the first memory device further includes instructions that are executable by the processor for causing the processor to receive the description by transmitting a request for the description to the first container.

7. The system of claim 6, wherein the first container is configured to provide the description in response to receiving the request.

8. A computer-implemented method comprising:

scheduling, by a management node of a cloud network, a first container and a second container for execution by a client device, the first container being scheduled to be activated subsequent to an execution phase of the second container;

determining, by the management node, that the second container is in the execution phase;

receiving, by the management node and from the first container, a description specifying a data object for activating the first container;

receiving, by the management node, the data object for the first container from a storage device of a first storage node of the cloud network using the description;

storing, by the management node, the data object in a second memory device of a second storage node of the cloud network and based on a quota specifying a first priority of the first container for the data object prior to an end of the execution phase of the second container for subsequent use in an activation of the first container by the management node, the second storage node being located closer in proximity to the client device than the first storage node, the first priority of the first container for the data object being different than a second priority of the second container for the data object; and storing the data object in the storage device in response to determining that the first container is deactivated, the storage device being a lower storage tier than the second memory device.

9. The method of claim 8, wherein the storage device is a first storage device and the data object is a first data object and the method further comprises:

receiving the quota for the first container specifying a third priority for a second data object associated with the first container;

receiving the second data object from the first storage device; and storing the second data object in a second storage device based on the quota prior to the end of the execution phase of the second container.

10. The method of claim 9, wherein the first storage device is slower than the second storage device.

11. The method of claim 9, wherein the quota specifies an additional priority for a third data object associated with the first container and the method further comprises maintaining the third data object in the first storage device based on the quota.

12. The method of claim 8, wherein storing the data object in the storage device in response to determining that the first container is deactivated comprises:

determining the first container is deactivated;

receiving the data object from the memory device; and storing the data object in the storage device.

13. The method of claim 8, further comprising receiving the description by transmitting a request for the description to the first container.

14. The method of claim 13, wherein the first container is configured to provide the description in response to receiving the request.

15. A non-transitory computer-readable medium comprising program code that is executable by a processor for causing the processor to:

schedule, by a management node, a first container and a second container for execution by a client device, the first container being scheduled to be activated subsequent to an execution phase of the second container;

determine, by the management node, that the second container is in the execution phase;

receive, by the management node and from the first container, a description specifying a data object for activating the first container;

receive, by the management node, the data object for the first container from a storage device of a first storage node of the cloud network using the description;

store, by the management node, the data object in a second memory device of a second storage node of the cloud network and based on a quota specifying a first priority of the first container for the data object prior to an end of the execution phase of the second container for subsequent use in an activation of the first container by the management node, the second storage node being located closer in proximity to the client device than the first storage node, the first priority of the first container for the data object being different than a second priority of the second container for the data object; and store the data object in the storage device in response to determining that the first container is deactivated, the storage device being a lower storage tier than the second memory device.

16. The non-transitory computer-readable medium of claim 15, wherein the storage device is a first storage device and the data object is a first data object, and further comprising program code that is executable by the processor for causing the processor to:

receive the quota for the first container specifying a third priority for a second data object associated with the first container;

receive the second data object from the first storage device; and store the second data object in a second storage device based on the quota prior to the end of the execution phase of the second container.

17. The non-transitory computer-readable medium of claim 16, wherein the first storage device is slower than the second storage device.

18. The non-transitory computer-readable medium of claim 16, wherein the quota specifies an additional priority for a third data object associated with the first container and further comprising program code that is executable by the processor for causing the processor to maintain the third data object in the first storage device based on the quota.

19. The non-transitory computer-readable medium of claim 15, further comprising program code that is executable by the processor for causing the processor to store the data object in the storage device in response to determining that the first container is deactivated by:

determining the first container is deactivated;
receiving the data object from the memory device; and
storing the data object in the storage device.

20. The non-transitory computer-readable medium of claim 15, further comprising program code that is executable by the processor for causing the processor to receive the description by transmitting a request for the description to the first container.

* * * * *